(12) United States Patent
Cooper

(10) Patent No.: US 10,455,467 B2
(45) Date of Patent: *Oct. 22, 2019

(54) HANDOVER BETWEEN MOBILE COMMUNICATION NETWORKS

(71) Applicant: NEC Corporation, Tokyo (JP)

(72) Inventor: David Cooper, Surrey (GB)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,579

(22) Filed: Jan. 29, 2014

(65) Prior Publication Data

US 2014/0179322 A1 Jun. 26, 2014

Related U.S. Application Data

(60) Continuation of application No. 12/846,466, filed on Jul. 29, 2010, now Pat. No. 8,676,203, which is a
(Continued)

(30) Foreign Application Priority Data

Jun. 7, 1999 (GB) .................................. 9913218.5

(51) Int. Cl.
*H04W 36/00* (2009.01)
*H04W 36/14* (2009.01)
*H04W 8/20* (2009.01)

(52) U.S. Cl.
CPC ....... *H04W 36/14* (2013.01); *H04W 36/0061* (2013.01); *H04W 8/205* (2013.01)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS 4,475,010 A * 10/1984 Huensch et al. .............. 370/334
4,670,905 A 6/1987 Sandvos et al.
(Continued)

FOREIGN PATENT DOCUMENTS

GB 2289191 A 11/1995
JP H06-237209 A 8/1994
(Continued)

OTHER PUBLICATIONS

U.S. Office Action dated Jun. 7, 2011 of related U.S. Appl. No. 09/589,217.
(Continued)

*Primary Examiner* — Dai Phuong
(74) *Attorney, Agent, or Firm* — Wilmer Cutler Pickering Hale and Dorr LLP

(57) ABSTRACT

A method of handover from an active network to a selected one of a plurality of potential other networks is provided. For example, the method may comprise scanning an area for all available networks within the area by a current active mobile communication network, storing a list of plurality of network identifiers and corresponding cell information based upon the scanning, receiving a signal from a user equipment, determining a signal level of the signal received from the user equipment; and transmitting a first message including a first list including the list of the plurality of network identifiers stored to the user equipment based upon the determined signal level. The transmitting of the first message occurs without the user equipment searching said mobile communication network. The list includes all of the available networks within the area. Also provided are user equipment and a mobile communication network for performing handover.

12 Claims, 1 Drawing Sheet

Related U.S. Application Data continuation of application No. 11/410,327, filed on Apr. 24, 2006, now abandoned, which is a division of application No. 09/589,217, filed on Jun. 7, 2000, now Pat. No. 8,682,325.

(58) Field of Classification Search
CPC ..... H04W 16/32; H04W 24/00; H04W 28/04; H04W 72/082; H04W 4/02
USPC ............. 455/432.1, 435.1–453, 456.1–456.3
See application file for complete search history.

(56) References Cited

U.S. PATENT DOCUMENTS

| | | | |
|---|---|---|---|
| 5,159,625 A | 10/1992 | Zicker | |
| 5,309,503 A | 5/1994 | Bruckert et al. | |
| 5,371,738 A * | 12/1994 | Moelard | H04W 36/0083 370/331 |
| 5,442,806 A | 8/1995 | Barber et al. | |
| 5,452,471 A | 9/1995 | Leopold et al. | |
| 5,594,731 A | 1/1997 | Reissner | |
| 5,594,781 A | 1/1997 | Kozdon et al. | |
| 5,613,204 A * | 3/1997 | Haberman | H04W 48/18 455/432.3 |
| 5,657,375 A | 8/1997 | Connolly et al. | |
| 5,664,005 A | 9/1997 | Emery et al. | |
| 5,678,184 A * | 10/1997 | Cutler, Jr. | H04B 7/18541 455/13.1 |
| 5,682,419 A | 10/1997 | Grube et al. | |
| 5,706,331 A * | 1/1998 | Wang | H04W 48/18 340/7.21 |
| 5,734,980 A | 3/1998 | Hooper et al. | |
| 5,745,481 A | 4/1998 | Phillips et al. | |
| 5,761,618 A * | 6/1998 | Lynch et al. | 455/419 |
| 5,790,952 A * | 8/1998 | Seazholtz | H04W 8/18 370/349 |
| 5,826,188 A * | 10/1998 | Tayloe | H04B 7/18563 455/428 |
| 5,862,480 A | 1/1999 | Wild et al. | |
| 5,884,168 A | 3/1999 | Kolev et al. | |
| 5,884,175 A | 3/1999 | Schiefer et al. | |
| 5,917,811 A | 6/1999 | Weaver et al. | |
| 5,940,761 A | 8/1999 | Tiedemann et al. | |
| 5,966,657 A * | 10/1999 | Sporre | 455/425 |
| 5,999,811 A * | 12/1999 | Molne | H04W 48/16 379/357.01 |
| 6,026,300 A | 2/2000 | Hicks | |
| 6,026,301 A | 2/2000 | Satarasinghe | |
| 6,044,265 A | 3/2000 | Roach, Jr. | |
| 6,064,887 A | 5/2000 | Kallioniemi et al. | |
| 6,075,981 A | 6/2000 | Shah et al. | |
| 6,088,335 A | 7/2000 | Chih-Lin et al. | |
| 6,122,503 A | 9/2000 | Daly | |
| 6,125,280 A | 9/2000 | Grandhi et al. | |
| 6,131,030 A | 10/2000 | Schon et al. | |
| 6,148,197 A | 11/2000 | Bridges et al. | |
| 6,173,181 B1 | 1/2001 | Losh | |
| 6,311,054 B1 | 1/2001 | Korpela | |
| 6,188,904 B1 * | 2/2001 | Marsan | H04W 36/0061 455/436 |
| 6,198,930 B1 | 3/2001 | Schipper | |
| 6,201,962 B1 | 3/2001 | Sturniolo et al. | |
| 6,201,969 B1 * | 3/2001 | Meier | H04W 36/18 370/320 |
| 6,208,857 B1 | 3/2001 | Agre et al. | |
| 6,212,384 B1 * | 4/2001 | Almgren et al. | 455/446 |
| 6,223,030 B1 | 4/2001 | Van Den Heuvel et al. | |
| 6,236,860 B1 | 5/2001 | Hagting et al. | |
| 6,246,875 B1 | 6/2001 | Seazholtz et al. | |
| 6,272,315 B1 | 8/2001 | Chang et al. | |
| 6,377,804 B1 | 4/2002 | Lintulampi | |
| 6,387,027 B1 | 5/2002 | Bodin | |
| 6,400,951 B1 | 6/2002 | Vaara | |
| 6,405,038 B1 | 6/2002 | Barber et al. | |
| 6,434,390 B2 | 8/2002 | Rahman | |
| 6,438,370 B1 | 8/2002 | Einola et al. | |
| 6,449,482 B1 | 9/2002 | Johansson et al. | |
| 6,469,995 B1 | 10/2002 | Voyer et al. | |
| 6,493,539 B1 | 12/2002 | Falco et al. | |
| 6,510,146 B1 | 1/2003 | Korpela et al. | |
| 6,516,193 B1 * | 2/2003 | Salmela | H04W 48/16 455/432.3 |
| 6,574,473 B2 | 6/2003 | Rinne et al. | |
| 6,584,116 B1 | 6/2003 | Gourgue et al. | |
| 6,600,925 B1 | 7/2003 | Rams | |
| 6,614,769 B1 | 9/2003 | Erlick et al. | |
| 6,697,354 B1 * | 2/2004 | Borella | H04L 29/12009 370/352 |
| 6,728,540 B1 * | 4/2004 | DeSantis et al. | 455/437 |
| 6,792,283 B1 | 9/2004 | Roberts et al. | |
| 6,947,398 B1 | 9/2005 | Ahmed et al. | |
| 7,184,765 B1 | 2/2007 | Birnie et al. | |
| 7,778,541 B2 | 8/2010 | Nishikawa | |
| 8,577,364 B2 * | 11/2013 | Bridges et al. | 455/433 |
| 2002/0037726 A1 | 3/2002 | Cazja et al. | |
| 2002/0042271 A1 * | 4/2002 | Choi | H04W 36/12 455/437 |
| 2002/0045447 A1 | 4/2002 | Rasanen | |
| 2002/0052206 A1 | 5/2002 | Longoni | |
| 2002/0122396 A1 | 9/2002 | Terasawa | |
| 2007/0066320 A1 | 3/2007 | Padovani et al. | |
| 2007/0253339 A1 * | 11/2007 | Ovadia | H04W 28/18 370/252 |
| 2007/0265000 A1 * | 11/2007 | Hanson | H04W 8/02 455/432.1 |
| 2009/0042578 A1 * | 2/2009 | Rinne | H04W 36/12 455/442 |
| 2010/0041401 A1 * | 2/2010 | Moore | H04W 36/06 455/434 |
| 2011/0028152 A1 * | 2/2011 | Okada | H04W 36/0083 455/437 |
| 2012/0009921 A1 * | 1/2012 | Bridges | H04W 48/16 455/432.1 |
| 2012/0250658 A1 * | 10/2012 | Eisl | H04L 63/1458 370/331 |
| 2013/0337778 A1 * | 12/2013 | Ye | H04W 36/0061 455/411 |

FOREIGN PATENT DOCUMENTS

| | | |
|---|---|---|
| JP | H08-205220 A | 8/1996 |
| JP | H10-190845 A | 7/1998 |
| JP | H11-75237 A | 3/1999 |
| WO | WO-97/47154 A1 | 12/1997 |
| WO | WO-98/02008 A2 | 1/1998 |
| WO | WO 98/30056 * | 7/1998 |
| WO | WO-98/49854 A2 | 11/1998 |
| WO | WO-98/59514 A2 | 12/1998 |
| WO | WO-99/18738 A2 | 4/1999 |
| WO | 9945723 | 9/1999 |

OTHER PUBLICATIONS

U.S. Notice of Allowance dated Nov. 4, 2013 of related U.S. Appl. No. 09/589,217.

U.S. Office Action dated Jan. 3, 2013 of related U.S. Appl. No. 09/589,217.

U.S. Office Action dated Sep. 17, 2010 of related U.S. Appl. No. 09/589,217.

U.S. Office Action dated Oct. 27, 2009 of related U.S. Appl. No. 09/589,217.

U.S. Office Action dated Jan. 27, 2009 of related U.S. Appl. No. 09/589,217.

U.S. Office Action dated Dec. 27, 2007 of related U.S. Appl. No. 09/589,217.

U.S. Office Action dated Mar. 16, 2007 of related U.S. Appl. No. 09/589,217.

U.S. Office Action dated Mar. 23, 2006 of related U.S. Appl. No. 09/589,217.

(56) References Cited

OTHER PUBLICATIONS

U.S. Office Action dated May 20, 2004 of related U.S. Appl. No. 09/589,217.
U.S. Office Action dated Jan. 16, 2004 of related U.S. Appl. No. 09/589,217.
U.S. Office Action dated Apr. 1, 2010 of related U.S. Appl. No. 09/589,217.
U.S. Office Action dated Jun. 19, 2009 of related U.S. Appl. No. 09/589,217.
U.S. Office Action dated Jul. 11, 2008 of related U.S. Appl. No. 09/589,217.
U.S. Office Action dated Aug. 10, 2007 of related U.S. Appl. No. 09/589,217.
U.S. Office Action dated Sep. 14, 2006 of related U.S. Appl. No. 09/589,217.
U.S. Office Action dated Oct. 7, 2005 of related U.S. Appl. No. 09/589,217.
U.S. Office Action dated Apr. 21, 2005 of related U.S. Appl. No. 09/589,217.
U.S. Office Action dated Oct. 27, 2009 of related U.S. Appl. No. 11/410,327.
U.S. Office Action dated Jan. 27, 2009 of related U.S. Appl. No. 11/410,327.
U.S. Office Action dated Dec. 27, 2007 of related U.S. Appl. No. 11/410,327.
U.S. Office Action dated Nov. 13, 2006 of related U.S. Appl. No. 11/410,327.
U.S. Office Action dated Mar. 29, 2010 of related U.S. Appl. No. 11/410,327.
U.S. Office Action dated Jun. 17, 2009 of related U.S. Appl. No. 11/410,327.
U.S. Office Action dated Jun. 27, 2008 of related U.S. Appl. No. 11/410,327.
U.S. Office Action dated May 2, 2007 of related U.S. Appl. No. 11/410,327.
U.S. Notice of Allowance dated Oct. 24, 2013 of related U.S. Appl. No. 12/846,466.
U.S. Office Action dated May 6, 2013 of related U.S. Appl. No. 12/846,466.
U.S. Office Action dated Nov. 9, 2011 of related U.S. Appl. No. 12/846,466.
U.S. Office Action dated Feb. 15, 2011 of related U.S. Appl. No. 12/846,466.
U.S. Office Action dated Jul. 23, 2012 of related U.S. Appl. No. 12/846,466.
U.S. Office Action dated Jul. 19, 2011 of related U.S. Appl. No. 12/846,466.
Japanese Office Action issued by the Japan Patent Office for Japanese Application No. 2004-223075 dated Sep. 12, 2006 (8 pages).
Japanese Office Action issued by the Japan Patent Office for Japanese Application No. 2006-179605 dated Mar. 3, 2009 (6 pages).

\* cited by examiner

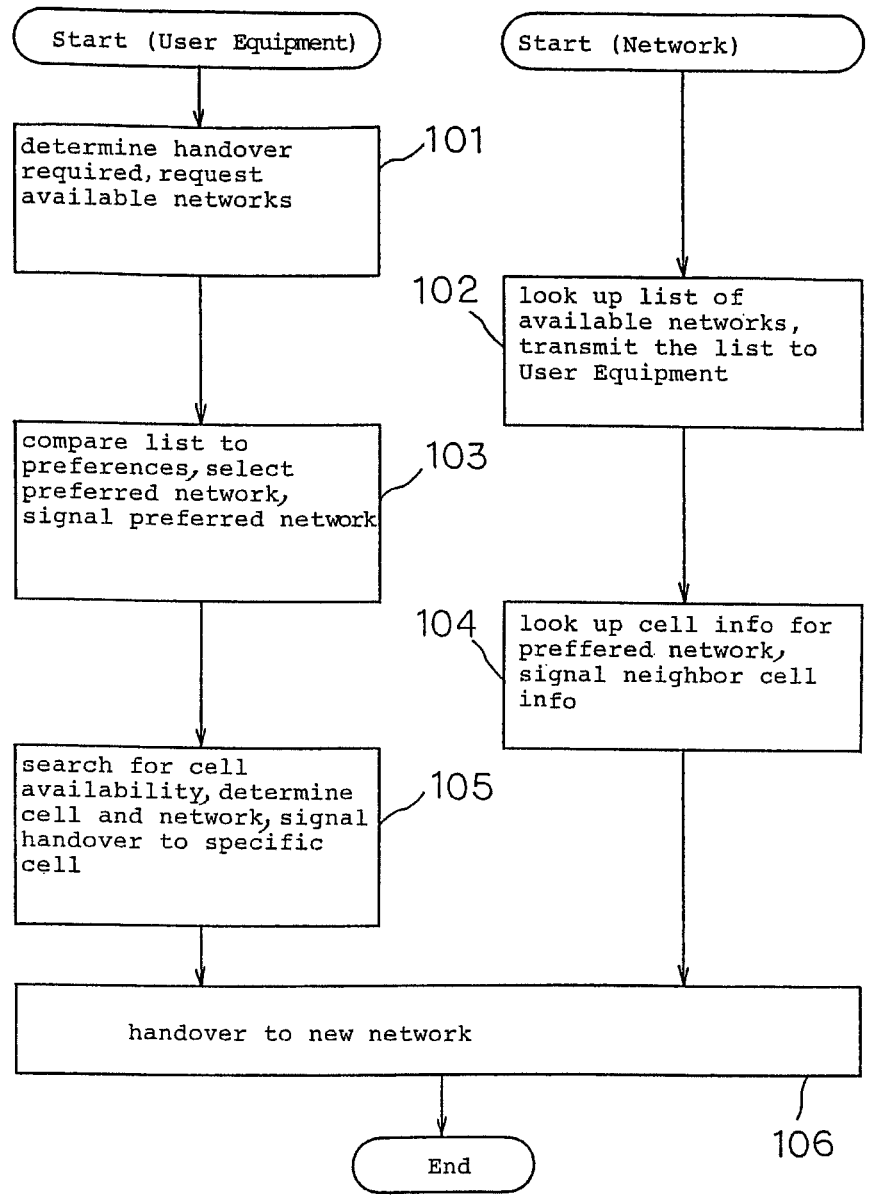

HANDOVER BETWEEN MOBILE COMMUNICATION NETWORKS

CROSS REFERENCE TO RELATED APPLICATIONS

This application is a continuation application of U.S. Ser. No. 12/846,466 filed Jul. 29, 2010 which is a continuation of U.S. Ser. No. 11/410,327, filed on Apr. 24, 2006 which application is a divisional application of U.S. patent application Ser. No. 09/589,217 filed on Jun. 7, 2000 which claims priority to Great Britain Patent Application 09913218.5 filed Jun. 7, 1999. The entire contents of each of the aforementioned Applications are incorporated herein by reference.

BACKGROUND OF THE INVENTION

Field of the Invention

The present invention is concerned with handover of a call between mobile communication networks. The present invention is particularly concerned with handover between UMTS networks and GSM networks but is also applicable to handover between different GSM networks and different cellular mobile communication networks generally.

Description of the Related Art

In current GSM systems, it is possible for a user to select manually among a plurality of available GSM networks when a mobile device (User Equipment) is off line. It is also possible for the User Equipment to select a network automatically from among the available networks based on preferences stored in the User Equipment, normally in the SIM card. However, when a call is in progress, this selection is not possible. In the present specification, the term User Equipment is intended to encompass any equipment capable of communicating with a network; this will typically be a mobile telephone, but may be, for example, a dedicated data, facsimile, E-mail or video communication device or combination device.

During call progress, the majority of the User Equipment's radio resource are involved in the active call and so it is not possible to scan broadly for available networks. To enable a mobile device to move between cells, while a call is in progress, the network supplies a limited list of adjacent cells, normally confined to cells provided by the same network provider and permits the mobile device to make limited investigation of signal strength from the neighboring cells. In the event that the mobile device finds a stronger signal from another cell, it can signal a change to the other cell.

According to above prior method, it is not impossible to hand over between mobile communication networks while call is in progress.

It has been appreciated that it would be desirable to enable User Equipment to select a preferred one of a plurality of available networks while a call is in progress. This would be particularly beneficial when handing over from a UMTS network to a selected GSM network', but would also be useful, particularly when traveling outside the User Equipment's home network territory, to enable handover between preferred "foreign" networks.

It has been appreciated that, although this is not normally done, it would be possible for an active network to supply a list of cells not only belonging to the active network, but also including cells of other network providers. This potentially offers a solution to the problem mentioned above, and may be provided independently in an aspect of the invention.

However, to implement the system, the network provider would have to supply a significant amount of information concerning other network providers' cells. Therefore, the above mentioned potential solution has the attendant problem that the list of available cells may become too large in practical terms for the User Equipment to investigate during an active call, and this may degrade performance of the network. This solution may therefore be undesirable for many network providers.

SUMMARY OF THE INVENTION

It is an object of the present invention is to provide a method capable of handing over between mobile communication networks while call is in progress.

Pursuant to the invention, an improved solution has been proposed. According to an aspect of the invention, the invention provides a method of facilitating handover from an active network with which User Equipment is in communication to another network. According to the present invention, the active network provides a list of available other networks to the User Equipment. User Equipment selects among the available networks based on preference information and signals to the active network at least one preferred other network. The active network provides neighbor cell information for the at least one preferred other network to the User Equipment.

In this way, the User Equipment may signal a preferred network to the active network and then the active network may transmit cell information for only the preferred network(s) to that User Equipment.

The preference information may be stored in the User Equipment, preferably in the SIM card. The preference information may include a list of networks which are "black listed" with which the User Equipment is not able to connect. The preference information may also include a list of networks which are "white listed" with which communication is preferred. The white list may include partner networks of the home network provider. The preference information may include an explicit "gray list" of networks which are to be tried in the absence of a "white listed" network; alternatively, networks which are not explicitly in the white list or black list may be deemed to be in the gray list. Multiple levels of preference may be stored. Preferably, the method includes storing in the User Equipment a list of available networks based on information supplied by the active network. This feature, using information supplied by a network rather than that obtained by a (relatively lengthy) search performed by the User Equipment, offers advantages.

The method may include incrementally adding to or deleting from the list of available networks stored in the User Equipment. This feature avoids the need to re-transmit a complete list, thereby allowing shorter messages to be used.

Using the method disclosed herein, it becomes possible for a network to send different neighbor cell information to different terminals (User Equipment), based on preferences expressed by the terminals and not solely dependent on the area in which the terminals are located.

The signaling of available networks by an active network is of itself a useful step as it provides a terminal with information concerning available networks without the terminal having to search.

The signaling by a terminal to an active network with which the terminal is in communication of a preferred (other) network in itself provides useful information to the active network.

The invention extends to methods of operating terminals and to methods of operating networks, terminals and network for implementing any the above aspects.

In a first preferred implementation, the active network is a UMTS network and the list of available networks comprises a list of available GSM networks. This implementation facilitates handover from UMTS to a selected GSM network.

In a second implementation, the active network is a GSM network (or a UMTS network) provided by an active network provider and the list of available networks comprises a list of other GSM networks (or UMTS networks) provided by other network providers. This facilitates handover within a communication system between network providers.

Also disclosed is user equipment for a mobile communication network which comprises a storage device, a receiver and a selector. The storage device is for storing a first list and a second list. The receiver is for receiving a first message from a current active mobile communication network while a call is in progress. The first message includes the first list of a plurality of network identifiers corresponding to a plurality of available networks for a potential handover. The plurality of available networks is determined by the current active mobile communication network by scanning an area for all available networks within the area. The first list is received from the current active mobile communication network based on a determined signal level of a signal transmitted by the user equipment. The selector is for selecting one network of the plurality of available networks to which the user equipment hands over based on a comparison of the first list and the second list. The second list includes at least a network identifier.

Also disclosed is a mobile communication network with which user equipment is connected comprising a receiver, a storage device, a processor comprising hardware and a transmitter. The receiver is for scanning an area for all available networks within the area. The storage device is for storing a list of plurality of network identifiers and corresponding cell information based upon the scanning. The list includes all of the available networks within the area. The processor comprising hardware is for determining a signal level of a signal received from the user equipment. The transmitter is for transmitting a first message including a first list including the list of the plurality of network identifiers stored to the user equipment based upon the determined signal level. The transmitting of the first message occurs without the user equipment searching the mobile communication network.

Also disclosed is a method comprising scanning an area for all available networks within the area by a current active mobile communication network and storing a list of plurality of network identifiers and corresponding cell information based upon the scanning. The list includes all of the available networks within the area; The method further comprises receiving a signal from a user equipment, determining a signal level of the signal received from the user equipment and transmitting a first message including a first list including the list of the plurality of network identifiers stored to the user equipment based upon the determined signal level. The transmitting of the first message occurs without said user equipment searching said mobile communication network.

The above and other objects, features and advantages of the present invention will become apparent from the following description with reference to the accompanying drawings which illustrate examples of the present invention.

BRIEF DESCRIPTION OF THE DRAWINGS

FIG. 1 is a flowchart showing a processing of the first embodiment according to the present invention.

DETAILED DESCRIPTION OF THE PREFERRED EMBODIMENTS

An embodiment of the invention will now be described, by way of example.

By way of explanation, we will describe in general terms, the elements of a practical implementation of a handover system embodying several of the above aspects and advantageous features. The following applies to both handover between networks of a similar type (e.g. GSM) belonging to different network providers, or between networks—of differing types (e.g. UMTS to GSM), unless otherwise stated. Indeed, in certain applications it may be possible to select between multiple networks of multiple types, for example GSM 900, GSM 1900, UMTS and local coverage networks.

Features of User Equipment

In addition to "standard" user equipment features, for communicating with the networks between which handover is to be performed (for a UMTS to GSM handover, this requires a dual mode terminal), the user equipment should ideally have the following components:

A store for a list of network preferences.

This may be based on an existing store, preferably in the SIM card (which term as used in this specification is intended to encompass any removable device which is used to configure a standard handset), and will normally be at least partially pre-programmed by the home network provider. The equipment may be configured to allow the user to edit at least part of this list, for example by adding networks or modifying preference levels.

In particular, where a network provider has two or more partner networks in a given (foreign) country and the charges vary (either permanently or from time to time) between networks, the user (or the network provider) may update the preference list so that the cheaper network is always preferred. The preference list may simply be binary, 0 for never use ("blacklisted"), 1 for use if possible ("white listed"), unlisted networks being used if a network annotated 1 is not found. Alternatively, multiple levels may be stored; this facilitates differentiation on the basis of pricing. If multiple levels are used, the home network may be given a unique, highest, preference. If only two or a few levels are provided, the home network may nonetheless be specifically marked, if desired. Although it is greatly preferred to store the preferences, the user may be prompted to select all alternative network on demand; this will normally be inconvenient during a voice call, but may be more acceptable in a data communication application. The order in which the networks are listed may or may not be significant; if it is, even in a binary system, the order of networks within the stored list may be used to designate preference and all white listed networks may be ranked in order. Thus, in the selecting step, the User Equipment may be arranged to find the first white listed available network.

Means for Receiving and Interpreting a Message Specifying Available Networks.

The User Equipment must be able to interpret a special message sent during an active call from the active network listing possible handover networks. This may be based on existing facilities for interpreting messages during a call, the special message being identified by a special prefix or identifier agreed with the network. It is to be noted that it may only be possible to perform preferential handover from certain networks but not others, particularly where certain networks are not configured to provide special messages identifying neighboring networks. For example, in the case of UMTS to GSM handover, the UMTS network may be arranged to provide a list of candidate GSM networks, but, when attempting to hand back to UMTS from a GSM network, or when attempting to hand over between at least certain GSM networks, this may not be possible as the GSM network(s) may not be adapted to provide lists of candidate networks.

Means for Maintaining List of Available Networks.

Preferably, the User Equipment is able, in addition to (or instead of) receiving a complete list of available networks, to receive and interpret messages specifying incremental addition or deletion of networks from the current list of available networks. In this way, a complete list of available networks may be built up in the User Equipment by a series of "ADD" messages, rather than by transmitting a complete list. This feature is particularly desirable in regions where there are a number of networks from which to choose and the availability of each network changes from place to place frequently, as it avoids the need to re-transmit a long list each time one network becomes or ceases to be available.

Means for Requesting a List of Available Networks.

The network may be arranged to transmit available network information regularly or when the network determines that handover is desirable (for example when the received signal becomes weak). However, preferably, the User Equipment is able specifically to request this information; this may be achieved in a similar manner to the conventional manner for User Equipment to send a handover, but using a message identifier agreed with the network as signifying a request for available networks.

Means for Comparing the List of Available Networks to the List of Preferences and Selecting a Network.

This may be achieved simply by searching for each available network in the list of preferences and returning the one (or top several) with the highest preference. Where more than one available network has an equal top preference, the User Equipment may select several in turn and then, following receipt of radio cell information, select the network with the strongest signal. Alternatively, other criteria may be provided.

Means for Signalling the Preferred Network.

This may be achieved simply by sending a message with an identifier agreed with the network to signify a network selection.

Thereafter, the network would supply neighbor cell information for the selected network(s) in a similar manner to that presently used to enable cell-to-cell handover and the User Equipment would treat this cell information (radio frequencies, time slots codes, etc.) in the same way to find the most suitable handover candidate.

Features of Network

In addition to "standard" network parameters, a network should implement the following features:—[0043] Store of list of available other networks.

This list varies from point to point, so it is conveniently stored at each base station or radio access point. This may be based on stored information, obtained either based on knowledge of other networks in the area and predicted coverage, or based on empirical data, for example obtained by scanning for radio coverage throughout the region covered by a cell, or by fixed receivers located at the access point and surrounding access points. Normally the network will not know the position of the User Equipment to much better than 1 cell accuracy (although, by triangulation from other cells in the network, accurate positioning is possible; alternatively, a rough idea of direction within the cell may be obtained), so the list of potentially available networks may include all networks receivable at any point within the cell. If the list omits certain networks which are in fact available, then handover to those networks will not be possible, so it is desirable to include more rather than fewer in the list. However, where too many networks are included, efficiency will be degraded, as the User Equipment may be instructed to search for an "available" network which is in fact not available. It may be possible to update the list dynamically, based on information returned from User Equipment concerning availability of networks.

For each available network, corresponding neighbor cell information (frequencies, time slots etc.) should be stored.

The network is configured to send and respond to messages described above in relation to the User Equipment. Thus, in a practical example, processing steps and exchange of messages are shown in FIG. 1. At step 101, User Equipment determines handover required and request available networks. At step 102, the active network looks up list of available networks and transmits the list to the User Equipment. At step 103, User Equipment compares the list to preferences, selects preferred network and signals the preferred network to the active network. At step 104, the active network looks up cell information for preferred network and signals neighbor cell information to the User Equipment. At step 105, the User Equipment searches for cell availability, determines cell and network and signals handover to specific cell. Finally, at step 106, handover to new network is implemented.

2nd Embodiment

The first embodiment above deals with transmission of a complete list of available networks in response to a specific request. The following second embodiment deals in particular with incremental updating of the list of available networks, and these details may be used in other contexts (not only in the UMTS to GSM handover case in which it is explained), for example in GSM to GSM handover.

Application to UMTS to GSM Handover

Three novel signaling procedures are proposed as below. All these procedures rely on local interaction between the dual mode terminal and the UTRAN, with no involvement of the VLR or core network.

We will assume that while a dual mode terminal has a call in progress, it maintains a list of potential GSM handover candidates {G1, G2, G3, . . . } (which may contain no entries if no potential GSM handover candidate is available). At any time it also has a preferred candidate Gpref which is a member of {G1, G2, G3, . . . }. This proposal describes signaling means whereby this list is maintained.

Signaling the Availability of Candidate GSM Networks

At any time during a call the serving UMTS network U can signal to the dual mode terminal the identity of one or more GSM network that are available, {Gi.} for potential handover. This signal contains the unique network identifier of each potential GSM network. This message would typically be used when the terminal first enters the coverage area of a potential candidate GSM network while a call is active, or sets up a call while within its coverage area, The terminal records the identity of the GSM networks, and compare it with internally stored information (for example a network preference list stored on the SIM and the identity of other available GSM networks previously signaled to it) and signals its preference Gpref back to the serving network, if it can identify a suitable network.

After this the serving network provides neighbor cell information relating to network Gpref until such time as the call ends, the terminal leaves the network or the terminal indicates a new value of Gpref.

Signaling the Non-Availability of an Existing Candidate GSM Network

When the terminal leaves the coverage area of a potential candidate GSM network during a call, the serving radio network U can signal to the terminal at any time the identity of GSM networks, {Gi.} that are now unavailable. This signal contains the unique network identifier of the GSM network which is no longer available.

The terminal can note that this GSM network is no longer available, and using internally stored information (for example a network preference list stored on the SIM and the identity of remaining available GSM networks) signals its preference Gpref back to the serving network, if a suitable network is identified.

After this the serving network provides neighbor cell information relating to network Gpref until such time as the call ends, the terminal leaves the network or the terminal indicates a new value of Gpref.

Terminal Network Preference

At any time the terminal can signal a new preference Gpref back to the serving network, which would be chosen from the list of available networks. After this the serving network provides neighbor cell information relating to network Gpref until such time as the call ends, the terminal leaves the network or the terminal indicates a new value of Gpref.

Typically this signal would be sent if the list of available GSM network changed in such a way that the preferred network needed to be re-evaluated.

In the above described second embodiment, the mobile device always has a preferred other network stored and is therefore regularly updated with neighbor cell information for that preferred network. This is particularly useful in the case of a dual mode terminal (the case of UMTS, to GSM handover being one example, GSM 900 to GSM 1900 being another example) where the "unused" mode components can be kept up dated and ready to change as soon as required.

To summarize, the above embodiments provide the following novel features, each of which may be independently provided:

The signaling of available GSM candidate network information.

The maintenance in the terminal of a list of available networks.

The possibility of incremental addition and deletion of elements of that list.

The ability of the terminal to indicate the preferred network.

The ability to send selective neighbor cell information to different dual mode terminals, so that different terminals within the same area may receive different neighbor cell information.

While preferred embodiments of the present invention have been described using specific terms, such description is for illustrative purposes only, and it is to be understood that changes and variations may be made without departing from the spirit or scope of the following claims.

What is claimed is:

1. User equipment for a mobile communication network comprising:
   a processor, a storage device, receiver circuitry, and transmitter circuitry,
   wherein the processor is configured to control operation of the storage device, receiver circuitry and transmitter circuitry,
   wherein, the storage device is configured to store a first list and a second list, the second list being a list of network preferences, said user equipment being configured to receive modifications to at least part of the second list from a user and update at least part of the second list stored in said storage device based thereon,
   wherein, the receiver circuitry is configured to receive a first message from a current active mobile communication network while a call is in progress, said first message including the first list of a plurality of mobile network identities corresponding to a plurality of available mobile networks for a potential handover, each mobile network being capable of supporting a plurality of cells, the plurality of available mobile networks being determined by the current active mobile communication network by scanning an area for all available mobile networks within the area, the first list being received from the current active mobile communication network based on a determined signal level of a signal transmitted by the user equipment,
   wherein the processor is configured to select one mobile network of the plurality of available mobile networks to which the user equipment is handed over based on a comparison of the first list and the second list, and
   wherein the transmitter circuitry is configured to transmit, to the mobile communication network, a message that comprises a mobile network identity that is selected from the first list of mobile network identities corresponding to the plurality of available mobile networks.

2. The user equipment according to claim 1, wherein the second list includes a preference level associated with a mobile network identity, and wherein the modification is changing the preference level for the mobile network identity.

3. The user equipment according to claim 1, wherein the modification is adding a mobile network identity to the second list.

4. A mobile communication network with which user equipment is connected comprising:
   a processor, a storage device, receiver circuitry, and transmitter circuitry,
   wherein the processor is configured to control operation of the storage device, receiver circuitry and transmitter circuitry,
   wherein the receiver circuitry is configured to scan an area for all available mobile networks within the area, each mobile network being capable of supporting a plurality of cells,
   wherein the storage device is configured to store a list of a plurality of mobile network identities and corresponding cell information based upon the scanning, the list including all the available mobile networks within the area;
   wherein the processor is configured to determine a signal level of a signal received from the user equipment, and
   wherein the transmitter circuitry is configured to transmit a first message including a first list that includes the list of the plurality of mobile network identities stored to the user equipment based upon the determined signal level, the transmitting of said first message occurring without said user equipment searching said mobile communication network, wherein the user equipment is associated with a second list, the second list being a list of network preferences, at least part of the second list is configured to be modified by a user, and at least part of the second list is updated based thereon, wherein the receiver circuitry receives from the user equipment a message that comprises a mobile network identity that is selected from the first list of mobile network identities corresponding to the plurality of available mobile networks.

5. The mobile communication network according to claim 4, wherein the second list includes a preference level associated with a mobile network identity, and wherein the modification is changing the preference level for the mobile network identity.

6. The mobile communication network according to claim 4, wherein the modification is adding a mobile network identity to the second list.

7. A method comprising:

scanning an area for all available mobile networks within the area by a current active mobile communication network, each mobile network being capable of supporting a plurality of cells;

storing a list of plurality of mobile network identities and corresponding cell information based upon the scanning, the list including all the available mobile networks within the area;

receiving a signal from a user equipment;

determining a signal level of the signal received from the user equipment;

transmitting a first message including a first list that includes the list of the plurality of mobile network identities stored to the user equipment based upon the determined signal level, the transmitting of said first message occurring without said user equipment searching a mobile communication network, wherein the user equipment is associated with a second list, the second list being a list of network preferences, at least part of the second list is configured to be modified by a user, and wherein at least part of the second list is updated based thereon; and receiving from the user equipment a message that comprises a mobile network identity that is selected from the first list of mobile network identities corresponding to the plurality of available mobile networks.

8. The method according to claim 7, wherein the second list includes a preference level associated with a mobile network identity, and wherein the modification is changing the preference level for the mobile network identity.

9. The method according to claim 7, wherein the modification is adding a mobile network identity to the second list.

10. The method according to claim 7, wherein the first list includes mobile networks of different mobile network providers.

11. The method according to claim 7, wherein the first list includes mobile networks having different protocols.

12. The method according to claim 11, wherein the different protocols includes UMTS and GSM.

* * * * *